(12) United States Patent
You et al.

(10) Patent No.: US 7,584,985 B2
(45) Date of Patent: Sep. 8, 2009

(54) FOLDABLE BABY STROLLER

(75) Inventors: Youn-Fu You, Chang Hua (TW);
Tse-Chien Wu, Kaohsiung (TW);
Wei-Yeh Li, Tainan County (TW)

(73) Assignee: Link Treasure Limited, Tortola (VG)

( * ) Notice: Subject to any disclaimer, the term of this patent is extended or adjusted under 35 U.S.C. 154(b) by 423 days.

(21) Appl. No.: 11/503,983

(22) Filed: Aug. 15, 2006

(65) Prior Publication Data

US 2007/0085302 A1    Apr. 19, 2007

(30) Foreign Application Priority Data

Oct. 19, 2005    (TW) ............................... 94218074 U

(51) Int. Cl.
*B62B 7/00* (2006.01)
(52) U.S. Cl. ...................... 280/643; 280/648; 280/658; 280/47.38
(58) Field of Classification Search ................. 280/642, 280/643, 647, 648, 650, 657, 658, 47.38
See application file for complete search history.

(56) References Cited

U.S. PATENT DOCUMENTS

| 4,386,790 | A | * | 6/1983 | Kassai | ......................... 280/650 |
| 4,741,551 | A | | 5/1988 | Perego | |
| 4,844,504 | A | * | 7/1989 | Bigo | ........................... 280/642 |
| 4,915,401 | A | * | 4/1990 | Severson et al. | ............... 280/30 |
| 5,104,134 | A | * | 4/1992 | Cone | ............................ 280/30 |
| 5,388,852 | A | * | 2/1995 | Bigo et al. | ................... 280/642 |
| 5,388,853 | A | * | 2/1995 | Lauro | .......................... 280/642 |
| 5,938,229 | A | | 8/1999 | Chen et al. | |
| 6,375,213 | B1 | * | 4/2002 | Suzuki | ......................... 280/649 |
| 6,918,608 | B2 | * | 7/2005 | Crisp | .......................... 280/642 |
| 7,077,423 | B2 | * | 7/2006 | Hutchinson | .................. 280/649 |

FOREIGN PATENT DOCUMENTS

| EP | 1086876 A2 | 3/2001 |
| GB | 2074106 A | 10/1981 |
| JP | 2002002497 | 1/2002 |

\* cited by examiner

*Primary Examiner*—Christopher P Ellis
*Assistant Examiner*—Brian Swenson
(74) *Attorney, Agent, or Firm*—Muncy, Geissler, Olds & Lowe, PLLC

(57) ABSTRACT

A foldable baby stroller, comprising simplified rods assembly for expanding and folding via linkage, includes a front supporter, a linking rod and a rear supporter, wherein the front supporter pivots to the rear supporter. One end of the front supporter connects to a sliding sleeve for driving by the handle bar, and the linking rod is pivotally connected between the handle bar and the rear supporter. Via the simple linkage, the sliding sleeve slides down and further driving the linking rod for rotation, in which the rear supporter is drawn close to the front supporter to be in a folded state. The simplified structure of the stroller has the effect of easy assembly and smoothly operation.

10 Claims, 6 Drawing Sheets

FOLDABLE BABY STROLLER

This application claims priority of Application No. 094218074 filed in Taiwan on Oct. 19, 2005 under 35 U.S.C. § 119, the entire contents of which are hereby incorporated by reference.

FIELD OF THE INVENTION

The invention relates to a foldable baby stroller and, in particular, to a stroller, which can be in either a fixedly expanded or a collapsed state.

DESCRIPTION OF THE PRIOR ART

Conventional baby stroller frame usually consists of several rods pivoted to one another to form as a linkage mechanism. A releasing device controls a hinge set disposed between the rods to allow a latch mechanism to operate releasing or locking either the stroller to be in an expanded or a collapsed state. As mentioned above, the stroller can be in a fixedly expanded state for conveying babies or reduce for saving space; however, the linkage mechanism is quite complicated with plenty procedure of difficulties and is awkward to handle while folding the stroller, such as the mechanism as disclosed as U.S. Pat. No. 5,772,235 and TW Patent Publication No. 175,901.

SUMMARY OF THE INVENTION

In order to resolve the above-mentioned problem, the present invention provides a foldable baby stroller with a new simplified rods assembly to achieve linkage of expanding and folding the stroller. According to the present invention, the stroller includes a front supporter, a linking rod and a rear supporter, wherein the front supporter pivots to the rear supporter. Through such simple connecting, when a sliding sleeve slipping down via a handle bar for folding, the linking rod is forced to rotate at the same time and also drive the rear supporter to draw close to the front supporter to be in a folded state. This simple and effective foldable baby stroller can achieve the goal of easy assembly and smoothly collapsed.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 1:
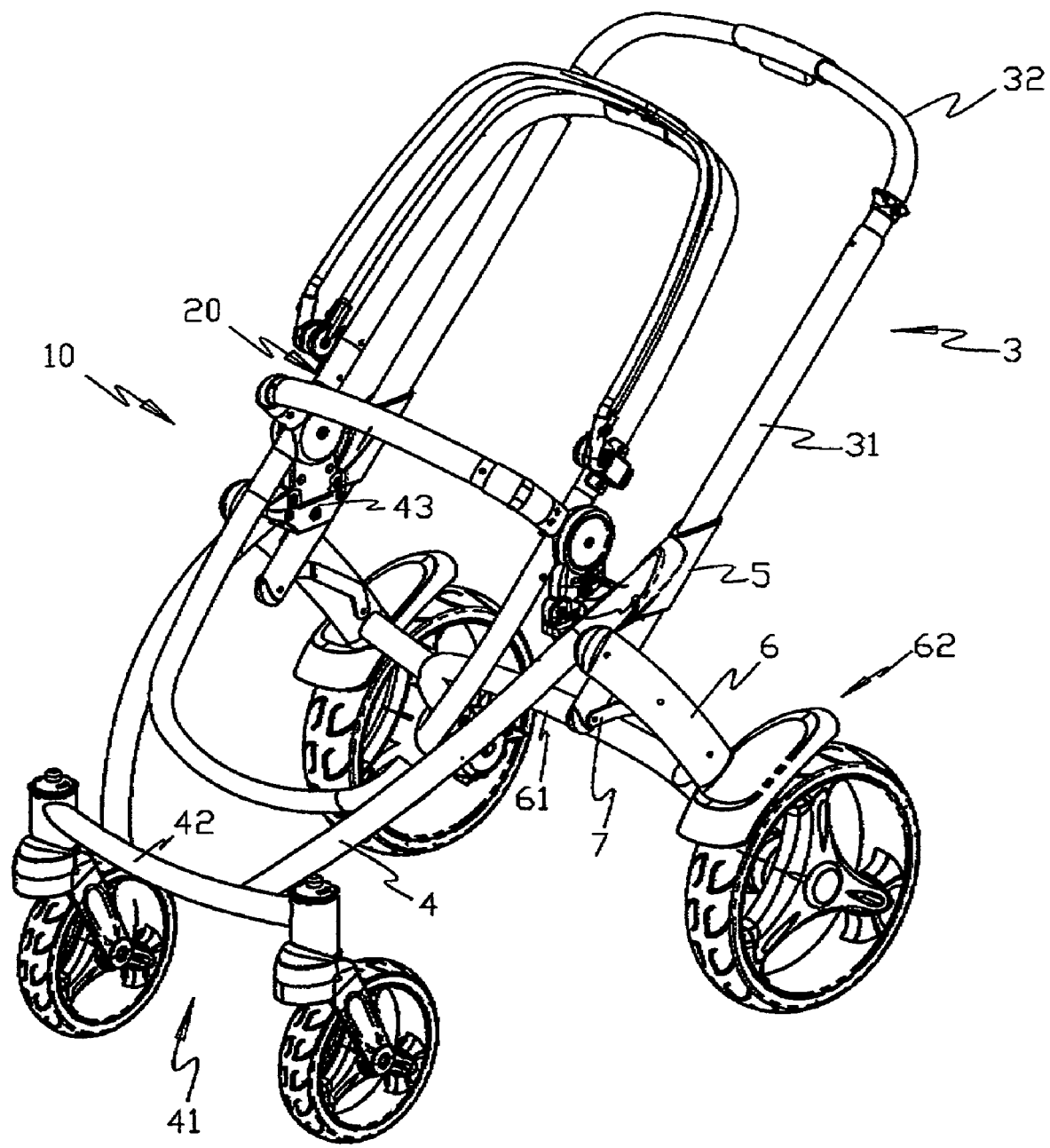
FIG. 1 is a perspective view of the stroller in an expanded state according to the present invention.

Shown in FIGS. 1~4 is an embodiment of the foldable baby stroller 10 provides users to expand or fold as they wish. The stroller includes a handle bar 3, a front supporter 4, a rear supporter 6, a linking rod 7 and a locking member 8, wherein the handle bar 3 comprises a lower tube 31 and a upper tube 32. It is better to have different size between the lower tube 31 and the upper tube 32, such as making a pipe size of the upper tube 31 smaller than the lower tube 32, so that the upper tube 32 can telescope with the lower tube 31 and expand or retract therein. An adjusting controller is disposed at the upper tube 32 for users to adjust the length to a suitable height.

A sliding sleeve 5 connects to upper end of the front supporter 4 and further telescopes with the lower tube 31 of the handle bar 3 to let the handle bar 3 slipping relatively with the sliding sleeve 5. In addition, the lower end of the front supporter 4 connects to a front wheel set 41; the front wheel set 41 includes a front transverse rod 42 for reinforcing its strength. In the present invention, a receiving base 43 is fixed inside the front supporter 4 for detachable connecting to a seat 20, which accommodates children. The rear supporter 6 pivots to the front supporter 4 with its upper end with its lower end connecting to a rear transverse rod 61 and rear wheel set 62.

Figure 5:
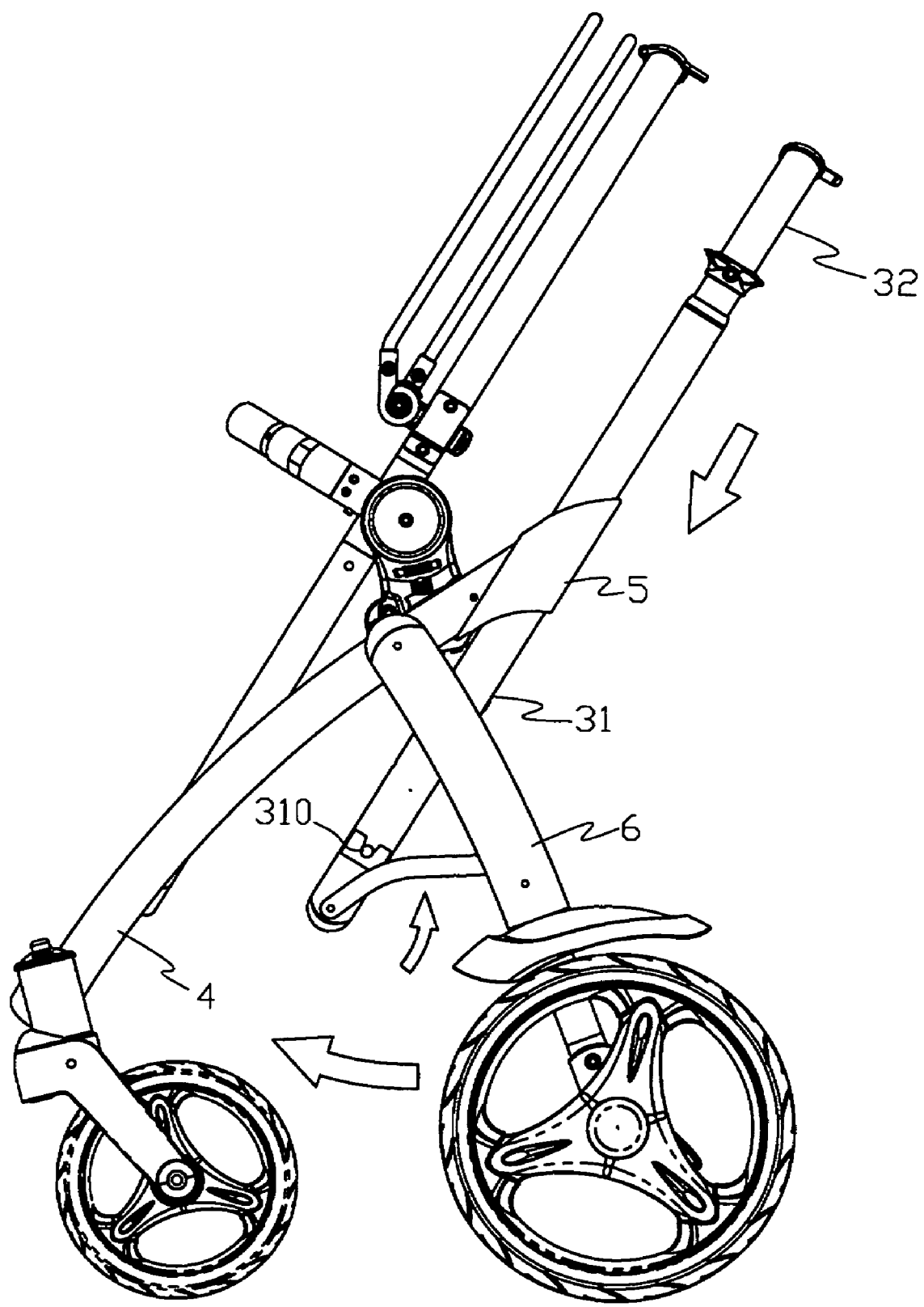
FIG. 5 is a side view showing the movement of folding the stroller of the present invention.
Figure 6:
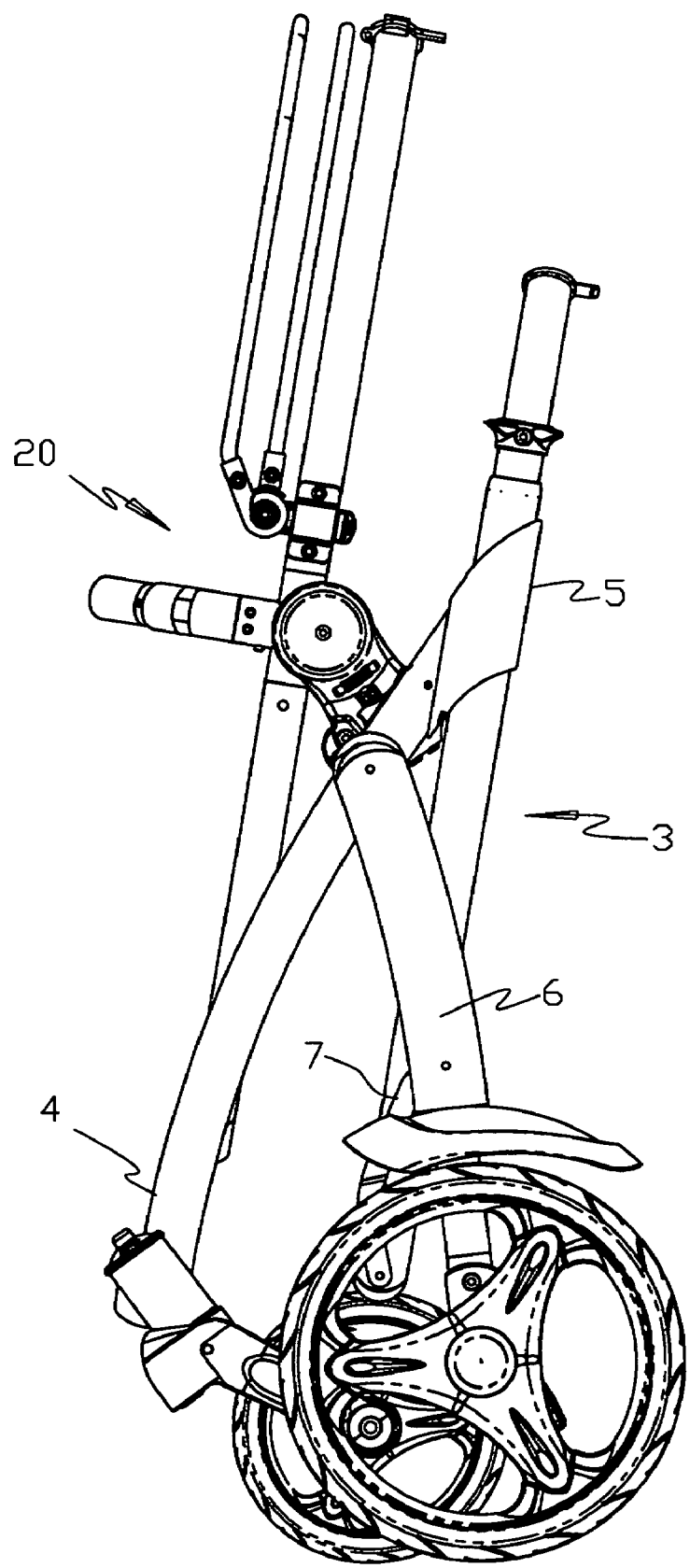
FIG. 6 is a side view of the stroller after being folded.

With reference to FIGS. 5 and 6, a linking rod 7 pivots between the lower tube 31 of the handle bar 3 and the rear supporter 6. While folding the stroller 10, the handle bar 3 slides down relatively to the sliding sleeve 5. Since the linking rod 7 pivots between the lower tube 31 and the rear supporter 6, the rear supporter 6 is forced to rotate to draw close to the front supporter 4 by the linking rod 7 to be in a folded state when the handle bar 3 moves downward.

Figure 2:
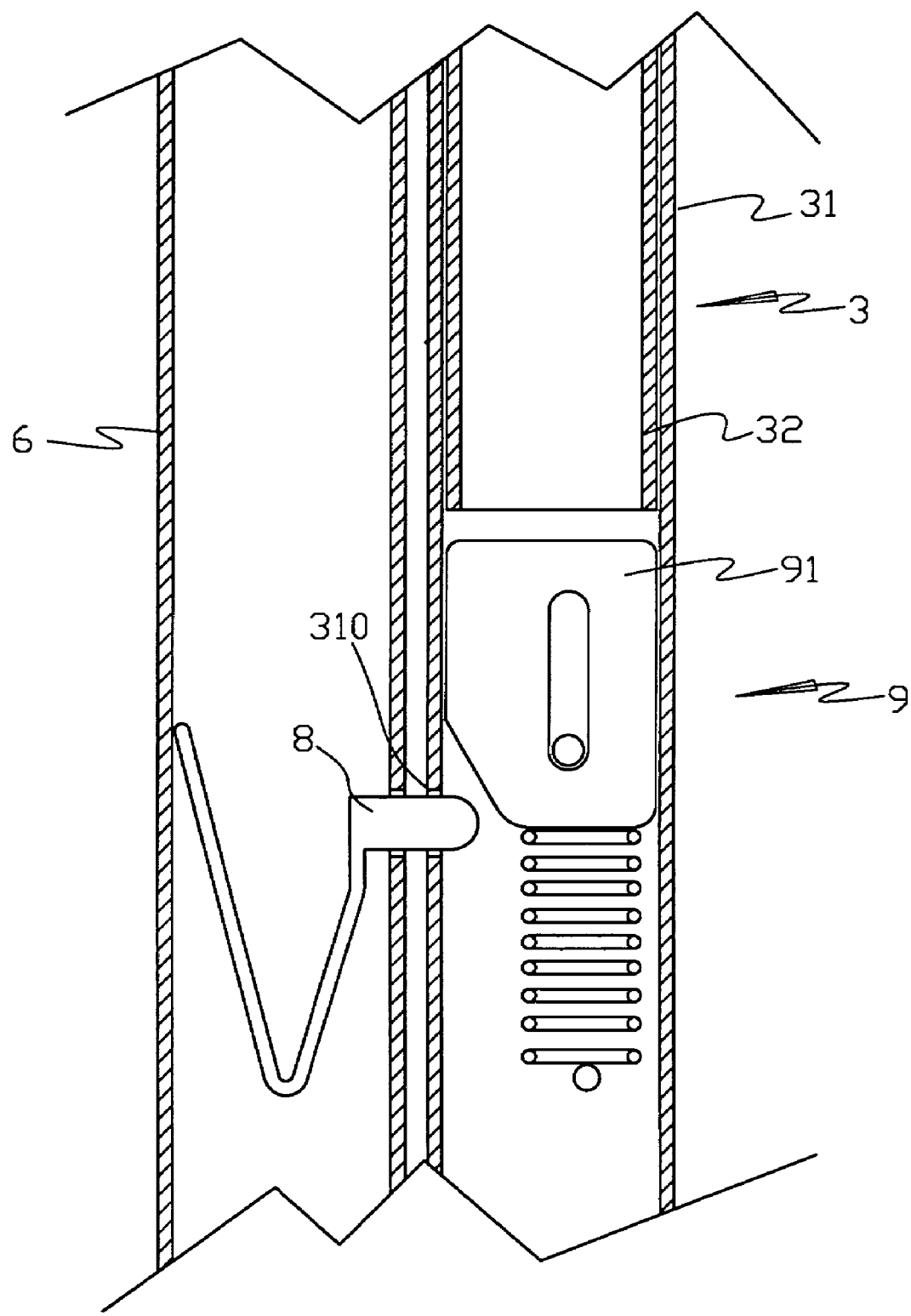
FIG. 2 is a cross sectional view of the releasing device of the present invention.
Figure 3:
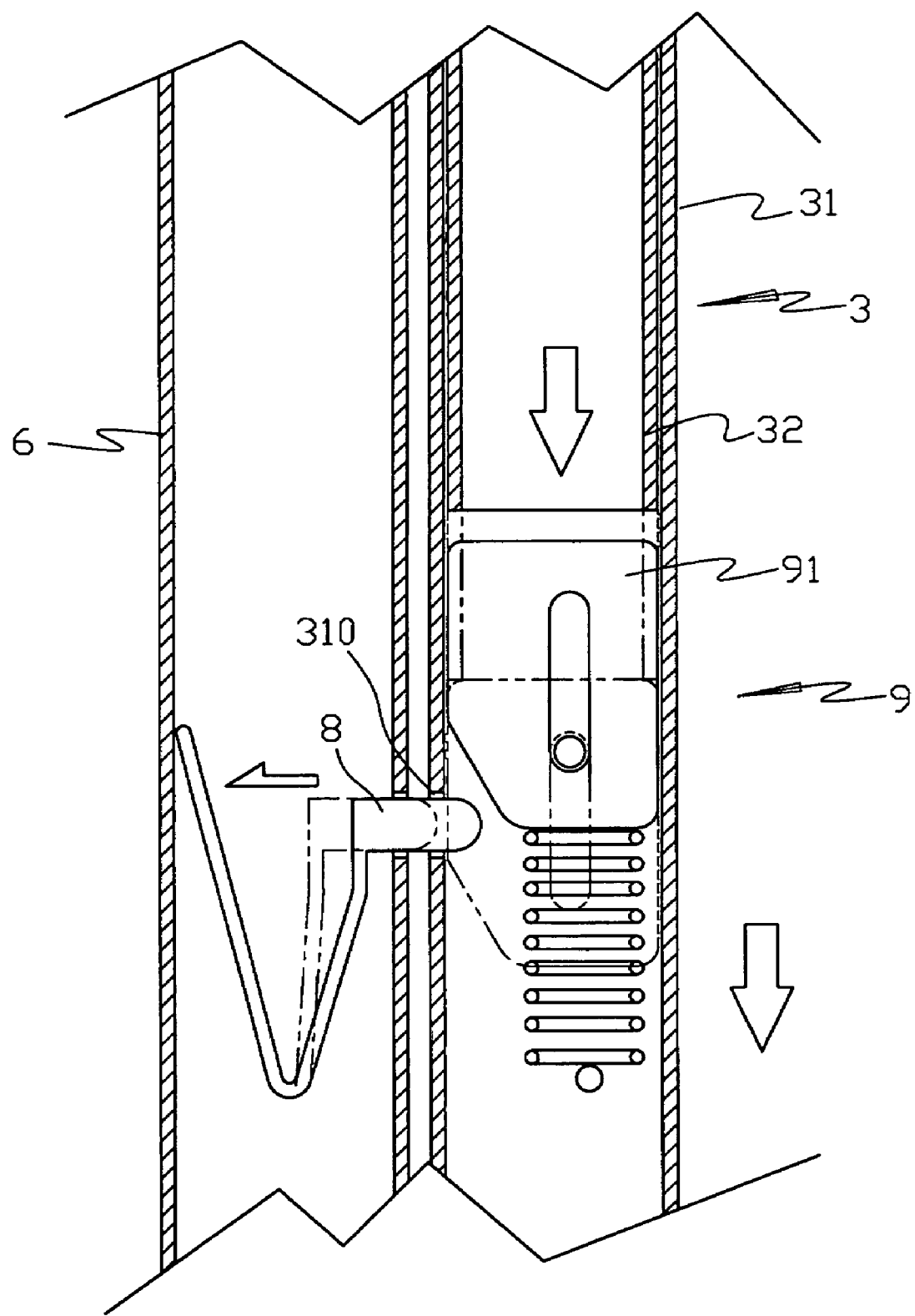
FIG. 3 is a cross sectional view showing the movement of the releasing device of the present invention.
Figure 4:
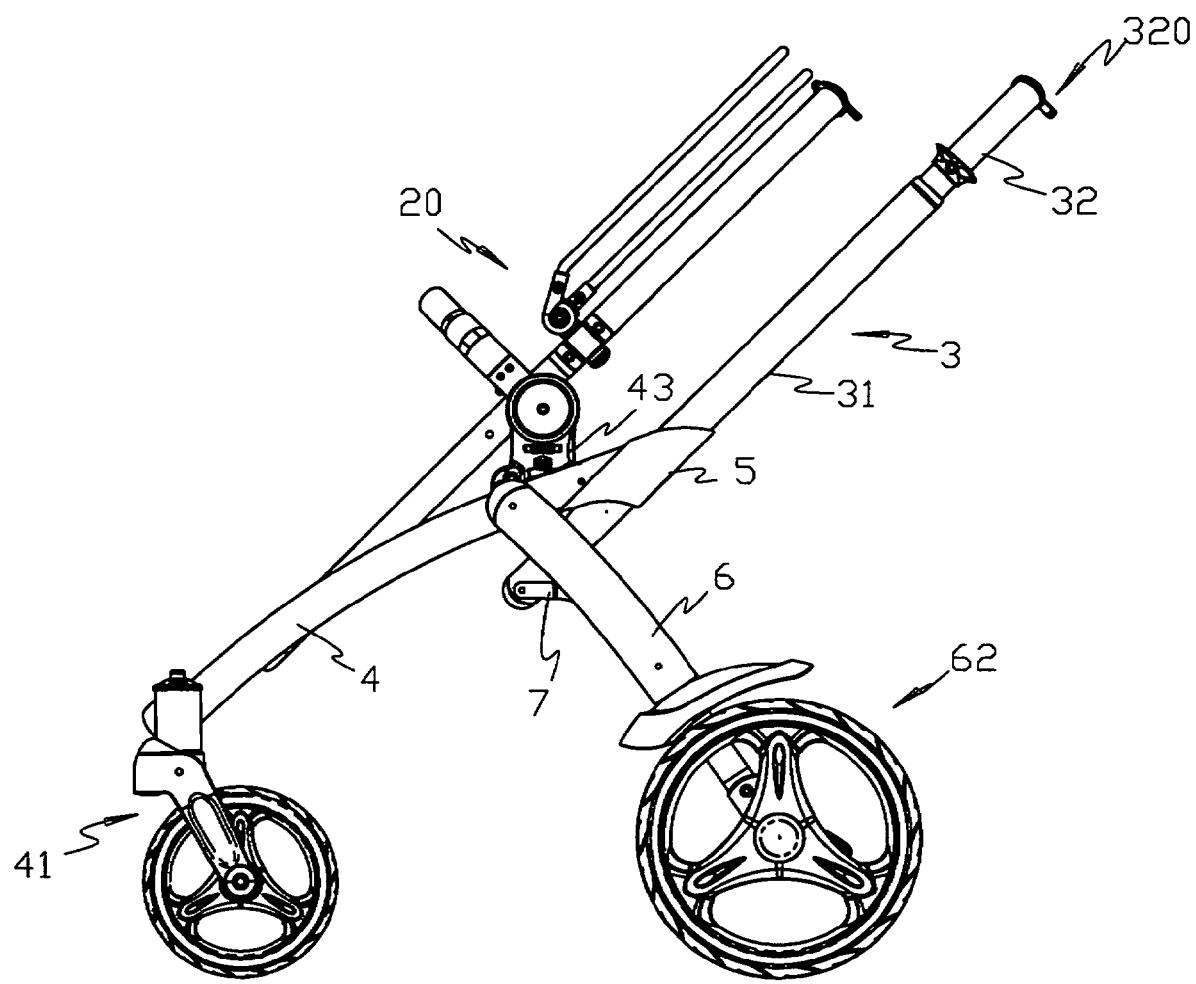
FIG. 4 is a side view of the stroller after being expanded.

Referring to FIGS. 2 and 3, a locking member 8 restrains at least two rod members such as the handle bar 3, the front supporter 4, the rear supporter 6 or the linking rod 7 so as to fix the stroller 10 to be in an expanded state as shown in FIGS. 1 and 4. In the present invention, the locking member 8 can be arranged between the handle bar 3 and rear supporter 6 or between the handle bar 3 and the front supporter 4 in order to limit movement of the handle bar 3.

In the present invention, the locking member 8 is a leaf spring with a protrusion provided within the rear supporter 6. When the stroller is in an expanded state, the protrusion of the locking member 8 engages with a relative positioning aperture 310 disposed at the lower tube 31 of the handle bar 3. If the locking member 8 is disposed at the front supporter 4, the positioning aperture 310 should also be arranged at a relative position of the handle bar 3 for restraining movement of the handle bar 3. Therefore, the stroller is fixed automatically after being expanded.

Referring to FIGS. 2 and 3, a releasing device 9 is in connection with the upper tube 32 of the handle bar 3 that is rotatable to disengage the locking member 8 from the positioning aperture 310. When the locking member 8 is disposed at the rear supporter 6, a reciprocation driving piece can be disposed inside the lower tube 31 of the handle bar 3, and when the upper tube 32 of the handle bar moves down to the lowest place, the upper end of the upper tube 32 just pushes the driving piece to disengage the locking member 8 from the positioning aperture 310 of the lower tube 31, so that the handle bar is free from restriction of the locking member 8; therefore, the handle bar can drive via the sliding sleeve 5 to rotate such rod members to draw close relatively to one another and so being collapsed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A foldable baby stroller, comprising:
    a handle bar;
    a front supporter, connecting with a sliding sleeve at its upper end, and the sliding sleeve telescoping to the handle bar so as to allow the handle bar slidably moves along the sliding sleeve; in addition, lower end of the front supporter is connected to a front wheel set;
    a rear supporter, pivoting to the front supporter by its upper end, and connecting to a rear wheel set by its lower end;
    a linking rod, pivoting between the handle bar and the rear supporter for driving by the handle bar; the linking rod also drives the rear supporter to draw close to the front supporter via its linkage;
    a locking member, movably mounting on the stroller for restraining movement of the handle bar so as to fix the stroller after being expanded, wherein the locking member is a leaf spring with a protrusion and disposed at one of the rear supporter and the handle bar; and
    a positioning aperture disposed at another of the rear supporter and the handle bar, to thereby lock the handle bar and the rear supporter after the stroller is expanded.

2. A foldable baby stroller as claimed in claim 1, wherein the handle bar includes an upper tube, a lower tube and an adjusting controller, wherein the upper tube telescopes to the lower tube and is adjusted by the adjusting controller to slide and position within the lower tube.

3. A foldable baby stroller as claimed in claim 1, wherein the stroller is provided with a releasing device in order to release the engagement between the locking member and the positioning aperture, and again push the handle bar to drive the other rod members for rotation and collapsed.

4. A foldable baby stroller as claimed in claim 3, wherein the releasing device includes a driving piece, which reciprocates arranged inside the lower tube; while pushing the handle bar to drive the driving piece and further pushing the locking member, the engagement is released between the locking member and the positioning aperture.

5. A foldable baby stroller as claimed in claim 1, wherein the front supporter is provided with a receiving base for connecting a base.

6. A foldable baby stroller as claimed in claim 1, wherein the positioning aperture is disposed at the handle bar; the locking member engages the positioning aperture to fix the stroller after being expanded.

7. A foldable baby stroller as claimed in claim 6, wherein the positioning aperture is disposed at the lower tube.

8. The foldable baby stroller as claimed in claim 1, wherein the positioning aperture is disposed at the rear support; the locking member engages the positioning aperture to fix the stroller after being expanded.

9. A foldable baby stroller, comprising:
    a handle bar;
    a front supporter, connecting with a sliding sleeve at its upper end, and the sliding sleeve telescoping to the handle bar so as to allow the handle bar slidably moves along the sliding sleeve; in addition, lower end of the front supporter is connected to a front wheel set;
    a rear supporter, pivoting to the front supporter by its upper end, and connecting to a rear wheel set by its lower end;
    a linking rod, pivoting between the handle bar and the rear supporter for driving by the handle bar; the linking rod also drives the rear supporter to draw close to the front supporter via its linkage;
    a locking member, movably mounting on the stroller for restraining movement of the handle bar so as to fix the stroller after being expanded; wherein the locking member is disposed at the front supporter for locking the handle bar to be unable to move freely after expanding the stroller.

10. A foldable baby stroller, comprising:
    a handle bar;
    a front supporter, connecting with a sliding sleeve at its upper end, and the sliding sleeve telescoping to the handle bar so as to allow the handle bar slidably moves along the sliding sleeve; in addition, lower end of the front supporter is connected to a front wheel set;
    a rear supporter, pivoting to the front supporter by its upper end, and connecting to a rear wheel set by its lower end;
    a linking rod, pivoting between the handle bar and the rear supporter for driving by the handle bar; the linking rod also drives the rear supporter to draw close to the front supporter via its linkage;
    a locking member, movably mounting on the stroller for restraining movement of the handle bar so as to fix the stroller after expanding;
wherein the locking member is disposed at the rear supporter for locking the linking rod to be unable to move freely so as to restrain the handle bar indirectly.

* * * * *